(12) United States Patent
Dye et al.

(10) Patent No.: US 9,946,699 B1
(45) Date of Patent: Apr. 17, 2018

(54) LOCATION-BASED SPEECH RECOGNITION FOR PREPARATION OF ELECTRONIC TAX RETURN

(75) Inventors: Christopher M. Dye, San Diego, CA (US); Azhar M. Zuberi, San Diego, CA (US); Richard E. McVickar, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 653 days.

(21) Appl. No.: 13/598,546

(22) Filed: Aug. 29, 2012

(51) Int. Cl.
*G10L 15/26* (2006.01)
*G06F 17/24* (2006.01)

(52) U.S. Cl.
CPC ............ *G06F 17/243* (2013.01); *G10L 15/26* (2013.01)

(58) Field of Classification Search
CPC ................................ G06F 17/243; G10L 15/26
USPC ......................................................... 704/235
See application file for complete search history.

(56) References Cited

U.S. PATENT DOCUMENTS

| | | | | |
|---|---|---|---|---|
| 5,864,810 A | * | 1/1999 | Digalakis | G10L 17/00 704/254 |
| 6,738,740 B1 | | 5/2004 | Barash | |
| 7,228,275 B1 | * | 6/2007 | Endo et al. | 704/235 |
| 7,698,566 B1 | * | 4/2010 | Stone | 713/186 |
| 8,209,183 B1 | * | 6/2012 | Patel et al. | 704/270 |
| 8,209,184 B1 | * | 6/2012 | Dragosh et al. | 704/270.1 |
| 8,805,673 B1 | * | 8/2014 | Neff | G09B 19/04 434/185 |
| 2001/0037199 A1 | | 11/2001 | Barash | |
| 2002/0091602 A1 | | 7/2002 | Stern et al. | |
| 2002/0143533 A1 | * | 10/2002 | Lucas et al. | 704/235 |
| 2003/0033146 A1 | * | 2/2003 | Morin et al. | 704/251 |
| 2003/0115057 A1 | * | 6/2003 | Junqua et al. | 704/235 |
| 2004/0148161 A1 | * | 7/2004 | Das | G10L 15/07 704/224 |
| 2004/0193603 A1 | * | 9/2004 | Ljubicich | H04M 3/493 |
| 2004/0199460 A1 | | 10/2004 | Barash | |
| 2005/0102133 A1 | * | 5/2005 | Rees | G03B 17/00 704/205 |
| 2006/0059434 A1 | * | 3/2006 | Boss et al. | 715/780 |
| 2006/0167686 A1 | * | 7/2006 | Kahn | 704/235 |
| 2007/0150279 A1 | * | 6/2007 | Gandhi | G10L 13/08 704/258 |
| 2007/0233487 A1 | * | 10/2007 | Cohen | G10L 15/065 704/255 |
| 2007/0250318 A1 | * | 10/2007 | Waserblat et al. | 704/236 |
| 2009/0012884 A1 | * | 1/2009 | Harman | G06Q 40/123 705/31 |
| 2009/0150156 A1 | * | 6/2009 | Kennewick et al. | 704/257 |
| 2009/0210225 A1 | * | 8/2009 | Simpson et al. | 704/235 |
| 2009/0326945 A1 | * | 12/2009 | Tian | G10L 15/005 704/254 |
| 2010/0057459 A1 | | 3/2010 | Barash | |
| 2010/0169092 A1 | * | 7/2010 | Backes et al. | 704/235 |
| 2011/0288866 A1 | * | 11/2011 | Rasmussen | H04L 12/1831 704/246 |

(Continued)

OTHER PUBLICATIONS http://nuance.com/dragon/index.htm.

(Continued)

*Primary Examiner* — Jakieda Jackson
(74) *Attorney, Agent, or Firm* — Vista IP Law Group LLP

(57) ABSTRACT

Methods, systems and articles of manufacture for location-based speech recognition for preparation of an electronic tax return.

32 Claims, 14 Drawing Sheets

(56) References Cited

U.S. PATENT DOCUMENTS

| | | | | |
|---|---|---|---|---|
| 2011/0295590 | A1* | 12/2011 | Lloyd et al. | 704/8 |
| 2012/0022865 | A1* | 1/2012 | Milstein | 704/235 |
| 2012/0151386 | A1* | 6/2012 | Sun et al. | 715/760 |
| 2012/0296646 | A1* | 11/2012 | Varthakavi | G10L 15/26 704/235 |
| 2012/0323574 | A1* | 12/2012 | Wang | G10L 15/22 704/246 |
| 2013/0332804 | A1* | 12/2013 | Seaman | G06F 17/243 715/201 |
| 2014/0088961 | A1* | 3/2014 | Woodward | G10L 15/22 704/235 |
| 2014/0180883 | A1* | 6/2014 | Regan | 705/31 |
| 2014/0237342 | A1* | 8/2014 | King et al. | 715/224 |

OTHER PUBLICATIONS http://www.vioicerecognition.com/board/lofiversion/index.php?t585.html.
http://www.irs.gov/formspubs/article/0,,id=98135,00.html.
www.turbotax.com.
http://support.google.com/chrome/bin/answer.py?hl=en&answer=1331723.

* cited by examiner

| VOICE SAMPLE 1061 | LOCATION DATA 1062 | CONVERTED / TRANSFORMED 1063 | TERMS / PHRASES 1064 | LINKS / MEANING (FOLLOW UP QUESTIONS / FORMS / FIELDS 1065 | USER FEEDBACK 1066 |
|---|---|---|---|---|---|
| VS1 | Loc1 | Conv1 | Terms1 | Link1 | FB1 |
| VS2 | Loc2 | Conv2 | Terms2 | Link2 | FB2 |
| VS3 | Loc3 | Conv3 | Terms3 | Link3 | FB3 |
| VS4 | Loc4 | Conv4 | Terms4 | Link4 | FB4 |
| ... | ... | ... | ... | ... | ... |
| VS n | Loc n | Conv n | Terms n | Link n | FB n |

FIG. 10A

LOCATION-BASED SPEECH RECOGNITION FOR PREPARATION OF ELECTRONIC TAX RETURN

SUMMARY

Embodiments are directed to interpreting, assisting in interpretation of, or confirming an interpretation of, voice data spoken by a preparer of an electronic tax return. For this purpose, embodiments generate, update and utilize a tax-relational database with commonly utilized tax return terms. Embodiments are operable to present an interpretation of the voice data or confirm an interpretation based on identifying the matching term in the data store when it is determined that received voice data matches a stored term.

Embodiments also provide for analysis of location data of the preparer and location data of terms and/or voice samples to which voice data is compared. The resulting voice data interpretations account for the preparer's speech attributes or mannerisms including, but not limited to, pronunciations, dialects, accents, colloquialisms, speech duration and cadence. Such location-based analysis can be performed during preparation of the electronic tax return. In this manner, for example, one preparer (e.g., located on east coast) may speak a first term that has a certain sound, whereas another preparer (e.g., in the Midwest) may speak a second, different term that also sounds similar to the first term, but embodiments are able to resolve these similar sounding terms to determine the different intended meanings utilizing location-based voice data analysis. As another example, one preparer (e.g., located on east coast) may speak a term one way with a first pronunciation, whereas another preparer (e.g., in the Midwest) may speak the same term in a different way with a second, different sounding pronunciation, and embodiments are able to determine that the different sounding voice data of the different preparers was intended to mean the same thing despite their different sounds.

The resulting interpretations may be utilized to identify fields or sections of the electronic tax return or to populate a field or section, populate one or multiple fields with the same tax return data, as well as identify other related, associated or linked fields or sections to be populated. Embodiments also provide enhanced control and navigation to the preparer by interpreting voice commands more accurately to improve the manner in which the preparer speaks to instruct or control the tax preparation application with voice commands and provide data for inclusion in an electronic tax return.

One embodiment is directed to a computer-implemented method for interpreting voice data of a preparer utilizing a tax preparation application to prepare an electronic tax return and is performed by a computing apparatus, which may be a computing apparatus that executes a tax preparation program to prepare the electronic tax return or that is in communication with the tax preparation program. The method comprises receiving voice data related to the electronic tax return. For example, the preparer may speak into a microphone of the computing apparatus. The method further comprises determining location data associated with the voice data. For example, the location data may be a geographic location of the preparer such as a city, state or zip code. As another example, the location data may involve data related to or reflecting the preparer's voice data such as data of the preparer's accent, pronunciation or colloquiums. The computing apparatus interprets the voice data provided by the preparer relative to the electronic tax return or as it pertains to the electronic tax return based at least in part upon the location data. Thus, embodiments provide for preparation of an electronic tax return while considering or accounting for the preparer's speech attributes.

A further embodiment is directed to a computer-implemented method for interpreting voice data utilizing a tax preparation application to prepare an electronic tax return and comprises the computing apparatus receiving voice data spoken by the preparer and related to the electronic tax return and determining location data associated with the voice data. The method further comprises accessing a data store comprising respective stored voice samples of respective persons in respective pre-determined geographic locations, identifying a selected voice sample as a match to the received voice data based at least in part upon the location data of the preparer and location data associated with the selected voice sample, and determining a meaning of the identified voice sample. The method further comprises interpreting the voice data relative to or as it relates to the electronic tax return based at least in part upon the location data, identifying a field or section of the electronic tax return based on interpreting the voice data and at least one additional field or section of the electronic tax return that is associated with the first field or section. The voice data is converted into tax return data (e.g., in digital form), and the first field or section and the at least one additional field or section with that tax return data. Thus, embodiments provide for voice entry of data to be utilized to identify or populate a section or field of an electronic tax return, and an initially identified field or section, as well as other related fields or sections throughout the electronic tax return or in other tax return forms, can be populated with the same data, while also accounting for location attributes such as the preparer's location or location attributes such as a geographic location or associated accents, pronunciations or colloquiums in that geographic location.

Yet other embodiments are directed to a computer program product, tangible medium or article of manufacture comprising a non-transitory computer readable storage medium embodying one or more instructions executable by a computer to perform a process for interpreting voice data while accounting for location data such as a geographic location of the preparer, and associated accents, pronunciations or colloquiums in that geographic location.

Further embodiments are directed to systems configured or operable to execute method embodiments. Systems may be embodied within or accessible by a tax preparation program that is operable to prepare and electronically file an electronic tax return. Systems may comprise a computing apparatus or mobile communication device configured or operable to execute methods, or system may include multiple components such as one or more of a voice analyzer and database.

In a single or multiple embodiments, the voice data that is analyzed is live voice data spoken by a user of a tax preparation application or preparer of the electronic tax return. For example, the preparer may speak into a microphone operably coupled to the computing apparatus such a computer or mobile communication device.

In a single or multiple embodiments, the interpretation of the voice data is based at least in part upon geographic location data such as address, city, state, zip code and country, already entered into the electronic tax return. Location data may also be determined or entered independently of previously entered or imported tax return data.

In other embodiments, interpretation of voice data is based at least in part upon location data such as a physical location or data representing a physical location of the computing apparatus. Examples of such location data include, but are not limited to, a global positioning system (GPS) location of the computing apparatus or location determined by other methods such as triangulation. In yet other embodiments, the physical location data may be in the form of or derived from an internet protocol (IP) address assigned to the computing apparatus.

In a single or multiple embodiments, interpretation of the voice data involves comparing the voice data to stored voice samples. For example, the computing apparatus accesses a data store comprising respective stored voice samples of respective persons in respective pre-determined geographic locations (e.g., a term related to an electronic tax return spoken by persons in different cities, states, zip codes or neighborhoods), and identifies a voice sample as a potential match to the received voice data and determines a meaning of the identified voice sample. Received voice data is then interpreted based at least in part upon the determined meaning. Thus, embodiments may be implemented such that received voice data is compared to stored voice samples reflecting how different persons at different locations speak the same terms related to the electronic tax return, such that similarities and differences between speech patterns in the voice data and stored voice samples are determined by the computing apparatus to interpret the received voice data utilizing location data. For example, voice samples of respective persons that speak the same term may be acquired or received and stored for comparisons with received voice data. The voice samples may be from other users of the tax preparation program or they can be parsed from other sources of speech data or speech samples such as various electronic and on-line sources, examples of which include a RSS or other audio feed and video sharing websites, which may contain voice data linked to or associated with the speaker's location.

Other embodiments may involve initially filtering the stored voice samples, e.g., based at least in part upon the location data of the preparer to select voice samples, and then comparing the received voice data and the subset or selected voice samples to identify a selected voice sample based at least in part upon the comparison and interpreting the received voice data. In the event that multiple stored voice samples are identified as potential matches, the preparer may select a voice sample that sounds the best or that is closest to how the preparer speaks. Voice data is then interpreted based at least in part upon the meaning of the voice sample selected by the preparer.

Embodiments may also involve receiving feedback from the preparer regarding the determined interpretation. The feedback can confirm the interpretation was correct, in which case the preparer's voice data can be stored with other voice samples for that interpretation and can be used for future voice analysis. In the event that the preparer's location is not associated with the correct interpretation, the computing apparatus can add the preparer's location data to be associated with that correct interpretation. Feedback may also clarify or correct the interpretation, in which case the voice data and/or location data of the preparer or source of the voice data is associated with a different interpretation, and this data may also be used in future voice data comparisons and interpretations. Thus, embodiments are "smart" or intelligent, or exhibit machine learning, by adding or deleting location data and voice samples over time for more accurate future voice data interpretation in connection with preparation of an electronic tax return.

In a single or multiple embodiments, embodiments can be implemented to present, audibly and/or visually, a message to the preparer asking the preparer "Did you mean 'X'" as a result of interpreting the voice data. This interpretation can also be used to identify a first field or section of the electronic tax return associated with the interpretation of the voice data, convert the voice data into tax return data, and populate the first field or section with the tax return data. Further, embodiments can identify other fields or sections related to or associated with the identified field or section, such that those other fields or sections can also be populated with the tax return data. Before any field or section is populated, the user can confirm that the tax return data is correct and that the identified fields or sections can be populated. Thus, the voice data interpretation can lead to identification of some or all other related fields or sections within the electronic tax return, and fields or sections may be in other forms or areas of the electronic tax return.

In a single or multiple embodiments, voice data interpretation is based at least in part upon a frequency domain representation (such as a Fourier transformation) of the received voice data and comparison of the voice data frequency domain representation with frequency domain representations of stored voice samples. Thus, in one embodiment, the received voice data is converted into a first frequency domain representation. This is compared with other frequency domain representations of voice samples of respective persons in respective pre-determined locations stored in the data store to identify a selected voice sample as a potential match to the received voice data based at least in part upon the comparison and determine a meaning of the selected voice sample. The received voice data is interpreted based at least in part upon the determined meaning.

After the electronic tax return (or an amended tax return) has been prepared, using importation, voice data interpretation and/or manual input, the electronic tax return can then be filed with a tax authority or other tax collecting entity.

BRIEF DESCRIPTION OF THE DRAWINGS

The foregoing and other aspects of embodiments are described in further detail with reference to the accompanying drawings, wherein:

FIGS. 10A-C illustrate how a data store or database can be generated or populated with pre-determined tax-related terms and associated identifications of sections, screens or fields of a tax return or tax preparation application, wherein FIG. 10A illustrates an example of a data store, database or table with voice samples and associated data, FIG. 10B illustrates an embodiment in which the data store or database is populated with voice samples spoken by other users of a tax preparation application, and FIG. 10C illustrates an embodiment in which the data store or database is populated with voice samples received, sampled or copied from another electronic or on-line source;

DETAILED DESCRIPTION OF ILLUSTRATED EMBODIMENTS

Embodiments are directed to speech recognition for preparing an electronic tax based on comparisons to commonly used electronic tax return terms and/or location-related speech data and speech attributes such as pronunciations, dialects, accents and colloquialisms of the preparer or that are associated with the preparer's location.

With embodiments, a voice analyzer determines the meaning or intent of the user's voice input. The meaning or interpretation may be confirmed by the preparer as necessary, and fields of the electronic tax return, which may be in different forms or interview pages, can be identified and populated with corresponding tax return data. In this manner, different tax preparation application users that have different location-based speech attributes can speak the same electronic tax return term with different sounds, and the different voice data resulting from different speech attributes of the users can be interpreted identity the same term, and identify a particular field to be populated by voice entry or speech recognition. Embodiments also utilize these results in an intelligent or smart manner to implement a machine learning system such that the voice data with different speech attributes received over time can be used to build, supplement, update or correct how voice data is analyzed and how the preparer's intended meaning of the voice data is determined. Further, with embodiments, once a tax form, field, or screen is identified, other associated or linked screens can be presented to the preparer without additional voice or manual input.

Figure 1:
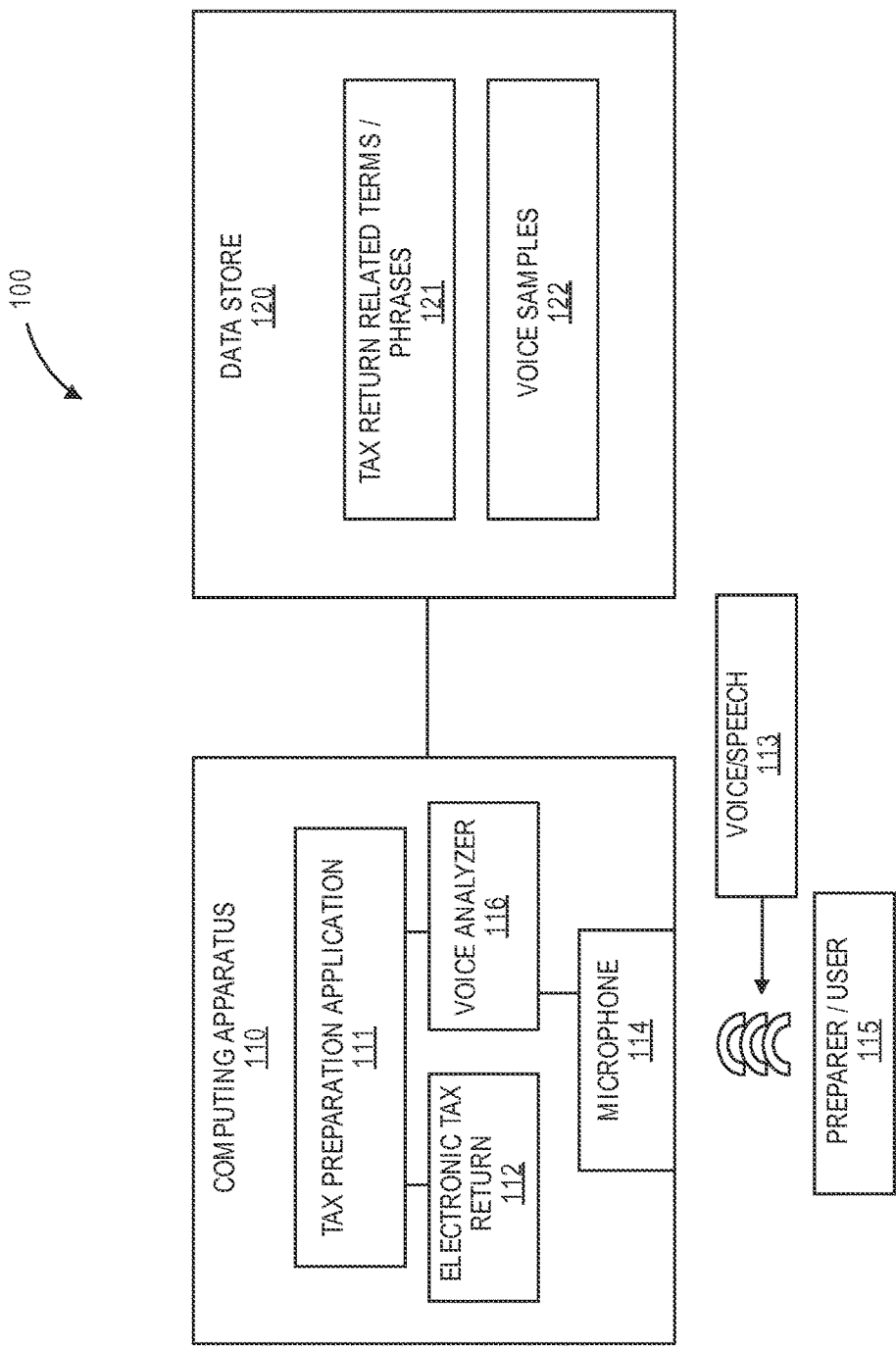
FIG. 1 is a block diagram of a system constructed according to one embodiment for interpreting voice data related to preparation of an electronic tax return.

Referring to FIG. 1, a system 100 constructed according to one embodiment comprises or involves a computing apparatus 110 utilized by preparer or user 115 (generally, "preparer") and that executes a tax preparation application 111 for preparation of an electronic tax return 112. The preparer 115 speaks voice or speech data 113 (generally, voice data) into a microphone 114 or other voice receiving component of the computing apparatus 110. Voice data 113 is interpreted by a controller, processor or voice analyzer or other computer element 116 (generally, voice analyzer) according to embodiments to determine the meaning of the voice data 113 and present aspects of the electronic tax return 112 or tax preparation application 111 to the preparer 115.

The voice analyzer 116 interprets voice data 113 with reference to a data store or database 120 (generally, data store). The data store 120 includes pre-determined or selected tax terms or phrases 121 and/or voice samples 122. Voice data 113 is compared with the terms 121 and/or voice samples 122 to locate a match or substantial match to determine the intended meaning of the preparer's voice input 113 as it relates to the tax preparation application 111 or an electronic tax return being prepared using the tax preparation application 111.

Figure 2:
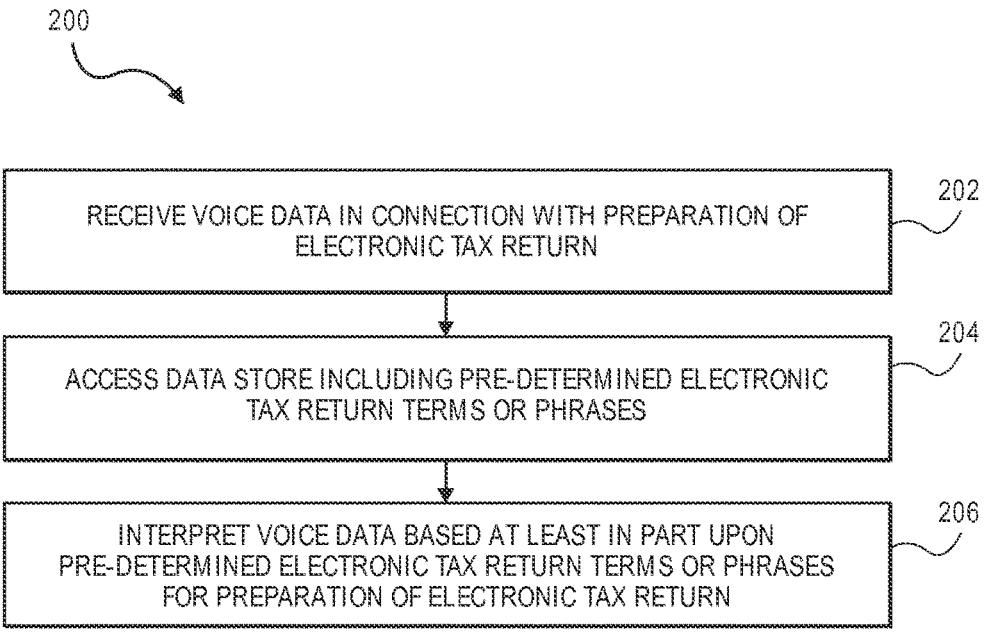
FIG. 2 is a flow diagram of one embodiment of a method for interpreting voice data related to preparation of an electronic tax return in which reference is made to pre-determined tax-related terms to interpret, aid in interpretation, or to confirm interpretation of voice data related to preparation of an electronic tax return.

Referring to FIG. 2, in another embodiment, a method 200 for interpreting voice data 113 of the preparer 115 comprises, at 202, the voice analyzer 116 receiving voice data 113 or data generated by the microphone 114 in response to voice data 113 (generally, voice data), and at 204, accessing the data store 120 of pre-determined electronic tax return terms 121. At 206, the voice analyzer 116 compares the voice data 113 and pre-determined terms 121, or converted or transformed forms thereof, to identify a match or substantial match to interpret, aid in interpretation, or confirm a prior interpretation of the voice data 113 based at least in part upon pre-determined electronic tax return terms 121 stored in the data store 120.

Figure 3:
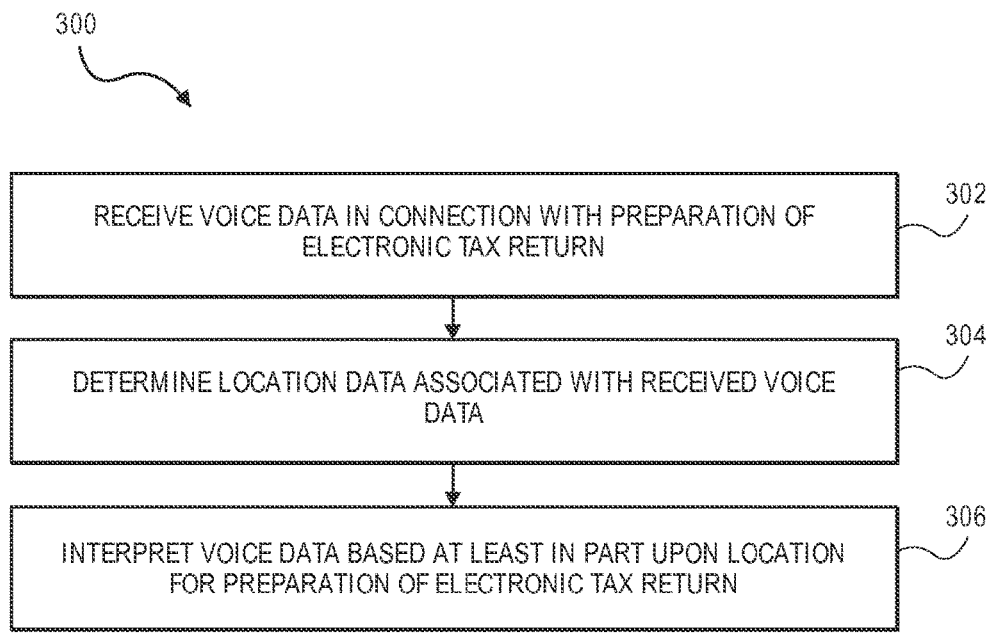
FIG. 3 is a flow diagram of one embodiment of a method for interpreting voice data related to preparation of an electronic tax return in which reference is made to location data of the received voice data to interpret, aid in interpretation, or to confirm interpretation of voice data related to preparation of an electronic tax return.

As another example referring to FIG. 3, a method 300 for interpreting voice data 113 according to another embodiment comprises, at 302, the voice analyzer 116 receiving voice data 113 in connection with preparation of electronic tax return 112 and at 304, determining location data associated with received voice data 113. At 306, the voice analyzer 116 interprets, aids in interpretation, or confirms a prior interpretation of the voice data 113 based at least in part upon the location data. The location data may be or be determined from location tax return data already entered into pre-determined fields of the electronic tax return 112 or independently entered or specified by the preparer 115, a physical location such as a physical location of the computing apparatus 110 as determined by various electronic methods, and/or data reflecting location-specific speech attributes of the preparer 115 such as pronunciations, dialects, accents, colloquialisms, and temporal aspects such as pauses, cadence and duration.

Figure 4:
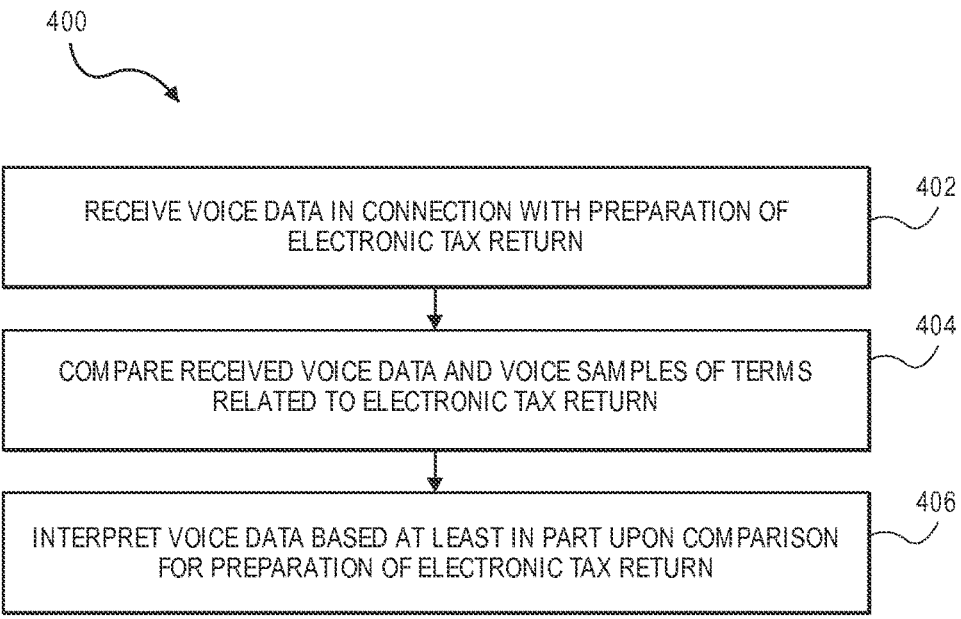
FIG. 4 is a flow diagram of one embodiment of a method for interpreting voice data related to preparation of an electronic tax return in which received voice data is compared with stored voice samples to interpret, aid in interpretation, or to confirm interpretation of voice data related to preparation of an electronic tax return.

Referring to FIG. 4, a further embodiment is directed to a method 400 for interpreting voice data 113 and comprises, at 402, the voice analyzer 116 receiving voice data 113 in connection with preparation of the electronic tax return 112. At 404, the voice data 113 and stored voice samples 122 of terms (or converted or transformed versions thereof) related to electronic tax returns are compared to identify a match or substantial match to interpret, aid in interpretation, or confirm a prior interpretation of voice data 113 based at least in part upon comparison in connection with preparation of the electronic tax return at 406.

Figure 5:
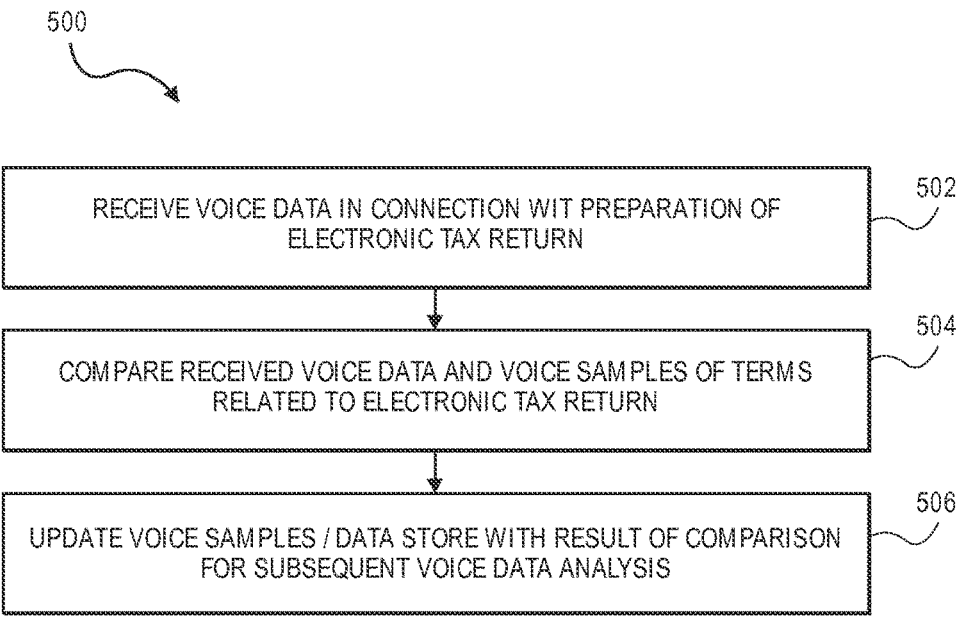
FIG. 5 is a flow diagram of one embodiment of a method for interpreting voice data related to preparation of an electronic tax return in which reference is made to pre-determined tax-related terms to interpret, aid in interpretation, or to confirm interpretation of voice data related to preparation of an electronic tax return and to update a database containing the voice samples based on the comparison.

Referring to FIG. 5, as yet another example, another embodiment of a method 500 for interpreting voice data 113 comprises, at 502, receiving voice data 113 in connection with preparation of the electronic tax return 112. At 504, received voice data 113 and voice samples 122 of terms related to electronic tax return 112 are compared, and at 506, stored voice samples 122 or associated voice sample data is updated based at least in part upon the comparison. The data store 120 may be updated, for example, by adding or deleting terms and/or voice samples. In this manner, the voice analyzer 116 provides for an intelligent system or "smart database" that records when interpretations were correct and when they are incorrect, and to update voice samples or associated data to reflect the results, thus improving the accuracy of future voice data interpretations.

Figure 6:
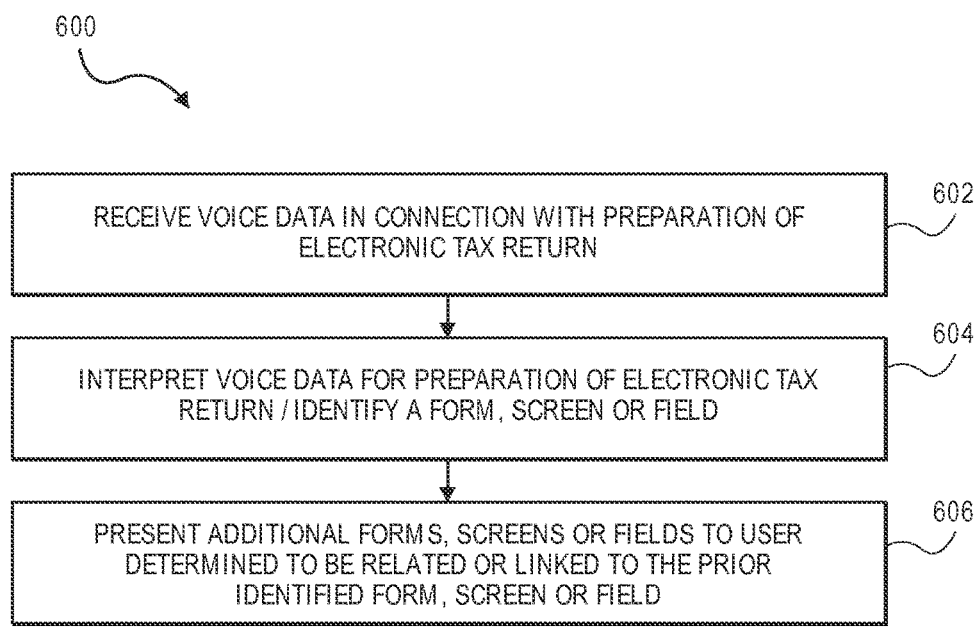
FIG. 6 is a flow diagram of one embodiment of a method for interpreting voice data related to preparation of an electronic tax return in which additional information such as other forms, interview screens or fields related to the interpretation is identified and presented to the preparer.

Referring to FIG. 6, as a further example, another embodiment of a method 600 for interpreting voice data 113 comprises, at 602, the voice analyzer 116 receiving voice data 113 in connection with preparation of the electronic tax return 112, and at 604, interpreting voice data 113. Voice data 113 interpretation may involve identifying a tax form, interview screen or field thereof corresponding to the voice data 113. At 606, embodiments further identify additional information such as additional tax forms, screens and fields that are related or linked to the prior identified tax form, screen or field and present that additional information to the preparer 115. The additional information may relate to the particular result or interpretation such as follow-up questions on that same topic and/or involve identification of other tax forms, interview screens or fields that are associated with linked to the interpretation result. In this manner, these additional forms, screens and fields can be presented to the preparer without additional voice input or, in other words, a particular voice input can result in retrieval of additional related information without further user voice input.

Further aspects of method and system embodiments and how they may be implemented to process verbal input utilizing the voice analyzer 116 and the data store or tax-relational database 120 and comparisons involving one or more of pre-determined terms or phrases, alpha-numeric data and/or voice samples, location-based or location specific speech attributes including, but not limited to, pronunciations, dialects, accents and colloquialisms, are described in further detail with reference to FIGS. 7-14.

Figure 7:
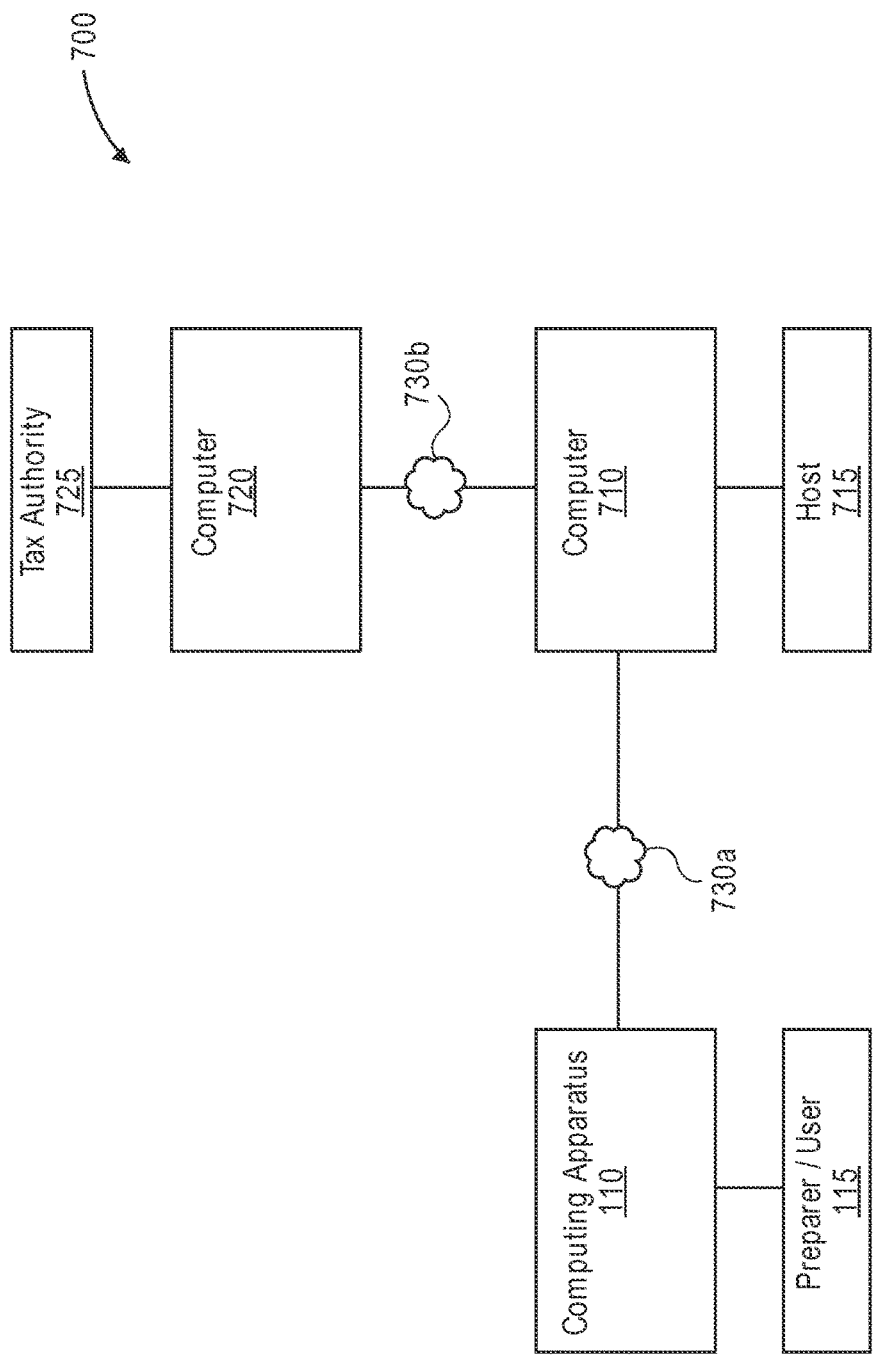
FIG. 7 is a block diagram of a system constructed according to one embodiment for interpreting voice data related to preparation of an electronic tax return and further illustrating how embodiments can be included within or operable with a local or desktop version of a tax preparation application operable to prepare and electronically file a tax return.

Referring to FIG. 7, and with continuing reference to FIG. 1, a system 700 constructed according to one embodiment and configured for preparation and filing of an electronic tax return 112 and incorporating or executing method embodiments comprises or involves a computing apparatus 110 of the preparer or user 115 utilizing the tax preparation application 111 to prepare an electronic tax return 112 (generally, "tax return"), a broker, facilitating or intermediate computer 710 (generally, "computer" or "intermediate computer") managed by a host 715, and a computer 720 of a tax authority or taxing agency 725 (generally, tax authority) with which the tax return 112 is to be filed.

Communications between various computers and between system 700 components are performed through respective networks 730a-b (generally, network 730). In the system 700 shown in FIG. 7, the preparer computing apparatus 110 is operably coupled to or in communication with the computer 710 through a network 730a, and the computer 710 is operably coupled to or in communication with the tax authority computer 720 through a network 730b. Each of the networks 730a-b (generally, network 730) and other networks 730 discussed herein may be different, or two or more networks 730 may be the same depending on the system configuration and communication protocols employed. One or more or all of the networks 730 may, for example, be a cellular network, a wireless network, a Local Area Network (LAN) and/or a Wide Area Network (WAN) or combinations of multiple networks. Reference to a network 730 generally is not intended to refer to a specific network or communications protocol, and embodiments can be implemented using various networks and combinations thereof.

The preparer 115 may be an individual, an accountant such as a Certified Public Accountant (CPA), a tax professional or other person or user (generally, "preparer" or "user") of the tax preparation application 111 executed to prepare the tax return 112. Examples of known tax preparation applications 111 are available from Intuit Inc., Mountain View, Calif. Tax preparation applications 111 embodied or utilized in a method, apparatus or technology, computer program product, or system, that is used solely for preparing a tax of information return 112 or other tax filing, and which may be operable to record, transmit, transfer and organize tax-related data for such tax filing. For ease of explanation, reference is made generally to tax preparation application 111.

Figure 8:
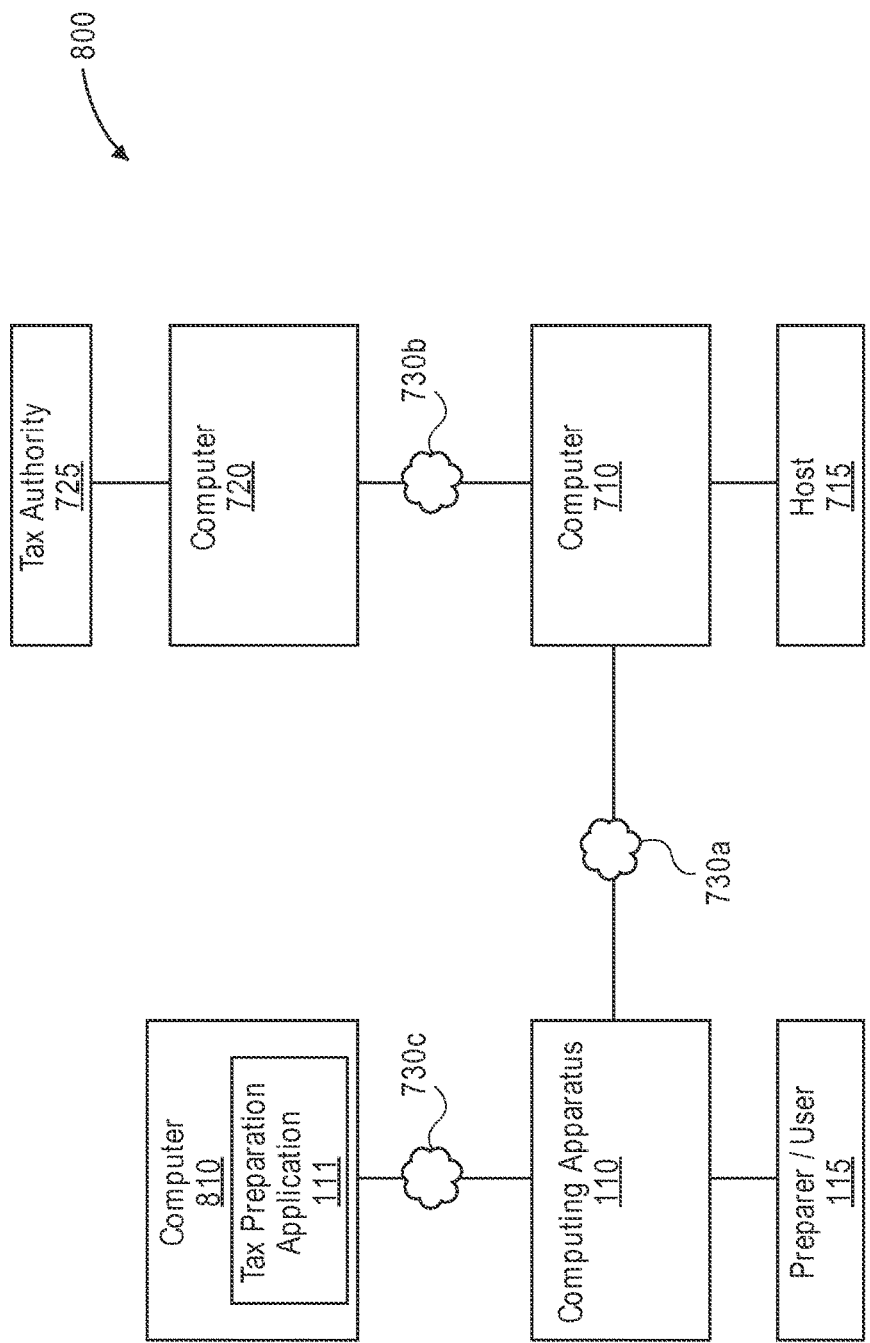
FIG. 8 is a block diagram of a system constructed according to one embodiment for interpreting voice data related to preparation of an electronic tax return and further illustrating how embodiments can be included within or operable with an on-line version of the tax preparation application operable to prepare and electronically file a tax return.

FIG. 7 illustrates a system 700 in which a desktop version of the tax preparation application 111 executes on the user's computing apparatus 110. Referring to FIG. 8, embodiments may also involve on-line versions of the tax preparation application 111. For this purpose, the preparer computer 110 may be operably coupled to or in communication with another computer or server 810 (shown in FIG. 8) that hosts a website through which the tax preparation application 111 can be accessed by the preparer 115 executing a browser on the preparer computing apparatus 110. For ease of explanation, reference is made to the tax preparation application 111 executing on the user's computing apparatus 110.

The user's computing apparatus 110 may be a laptop, desktop computer or tablet computing device or a mobile communication device such as a smartphone or personal digital assistant (PDA), or mobile computing or tablet device having mobile communication capabilities, and which is operable to execute or access the tax preparation application 111. The computing apparatus 110 includes or utilizes a voice receiving element or microphone 114 into which the preparer 115 can speak. Thus, the preparer 115 may access the tax preparation application 111 in the form of a desktop or on-line version, or as an application that is native or downloaded to the computing apparatus 110 depending on the type of computing apparatus 110 utilized. For ease of explanation, reference is made generally to the preparer's computing apparatus 110.

As shown in FIGS. 7-8, the intermediate computer 710 may host the voice analyzer 116 and/or data store 120 and may be managed by a host 715 and serve as, or be in communication with, an electronic filing system or server that functions as a "clearing house" for formatting and transmitting completed electronic tax returns 112 to the tax authority computer 720. Examples of a tax authority 725 include the Internal Revenue Service (IRS), a state tax authority and other tax collecting entity (generally, "tax authority"), which collects tax-related data of multiple taxpayers and entities. The intermediate computer 710 or clearing house may also process acknowledgements and other data received from the tax authority computer 720 and to route related information back to the preparer computer 110. A computer 710 that serves as an intermediate or electronic filing server is available from Intuit Inc., e.g., a server of the Intuit Electronic Filing Center.

While certain embodiments are described with reference to the data store 120 hosted by the intermediate computer 710, the data store 120 may be hosted by another computer or system such that it will be understood that the system configurations shown in FIGS. 1 and 7-8 are provided as examples of how embodiments may be implemented.

Referring to FIGS. 9A-C, before the voice analyzer 116 analyzes the preparer's voice data 116, the data store 120 is created or populated with pre-determined tax terms 121 and/or voice samples 122. The tax terms 121 and/or voice samples 122 may be associated with related location data.

Figure 9:
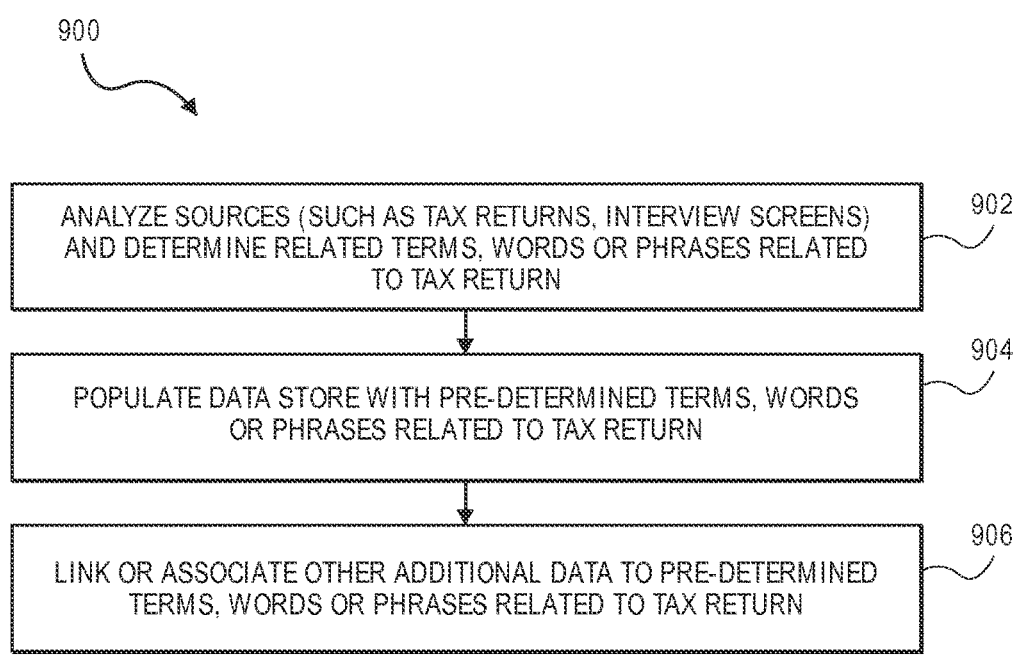
FIG. 9 is a flow diagram of one embodiment of a method for creating or populating a data store or database utilized in embodiments.

According to one embodiment, with reference to FIG. 9, a method 900 for creating or populating the data store 120 may involve at 902, the voice analyzer 116 or other component or program in communication with the data store 120 and data sources analyzing one or more of prior electronic tax returns, electronic tax returns of other users, and interview screens generated by the tax preparation application 111. This analysis is performed to determine terms, words or phrases 121 (generally, terms) that are commonly used in or related to tax returns. Such terms may be or relate to, for example, tax return data, tax returns and sections thereof, interview screens and dialogue generated by the tax preparation application 111.

At 904, the data store 120 is populated with the pre-determined or selected terms 121, and at 906, in certain embodiments and as illustrated, the data store 120 additional data related to these terms 121 may also be entered such as tax forms or interview screens, and fields thereof that are related to such terms, e.g., fields that are often populated with voice data of or related to the term. The data store 120 includes a table or other data structure with respective commonly used and pre-determined or selected terms 121 and associated data such as identification of a tax form, an interview screen or field thereof.

For example, the term "charity" may be associated with other related data in a table that identify one or multiple fields in one or multiple interview screens or forms of the electronic tax return 112 that are to be completed for the preparer's charitable deduction. As another example, if the term is "retirement plan" the data store 120 may also include other data identifying the forms or interview screens and fields for the preparer to enter retirement plan data such as 401k contributions, Roth IRA contributions, etc.

Figure 10B:
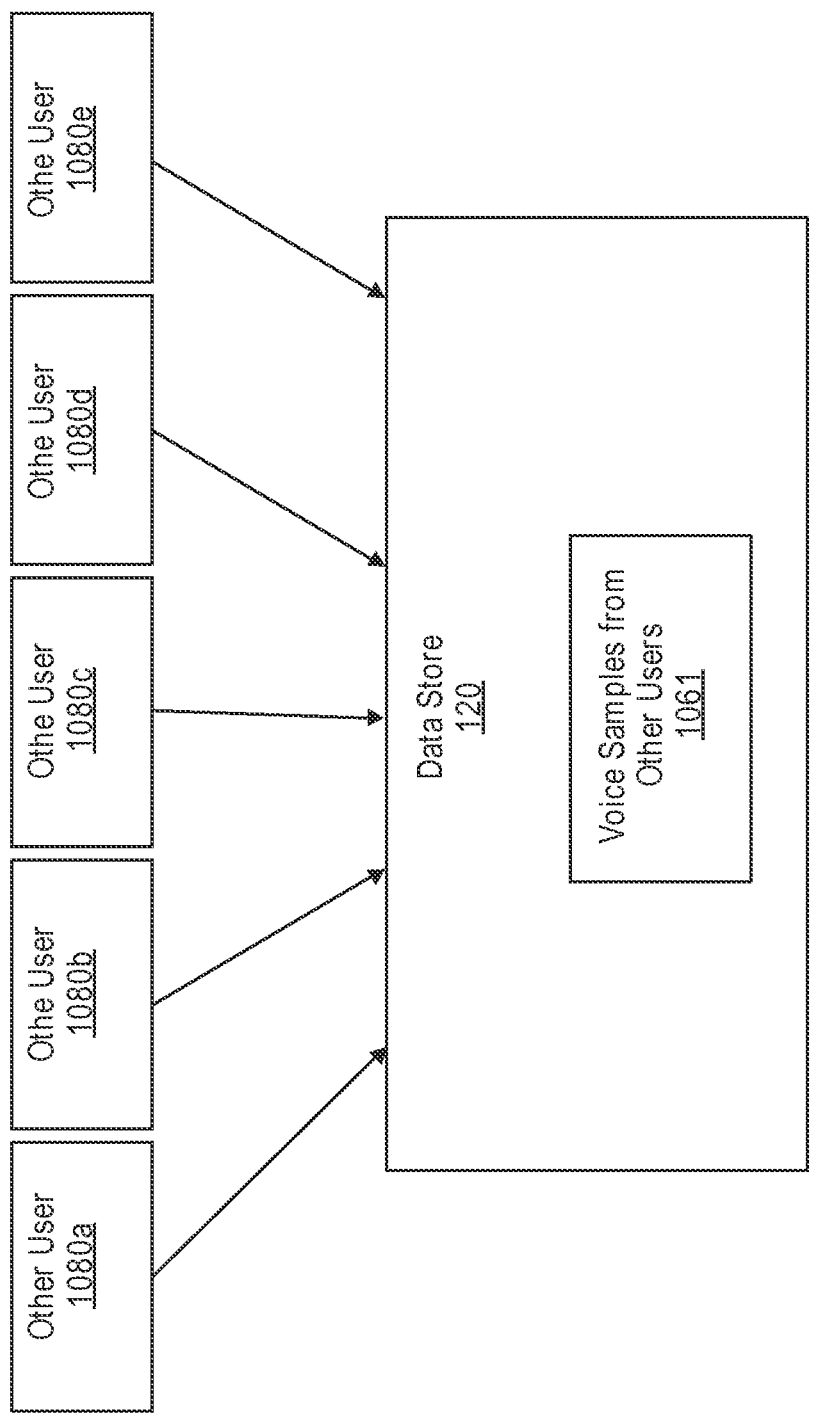
Figure 10C:
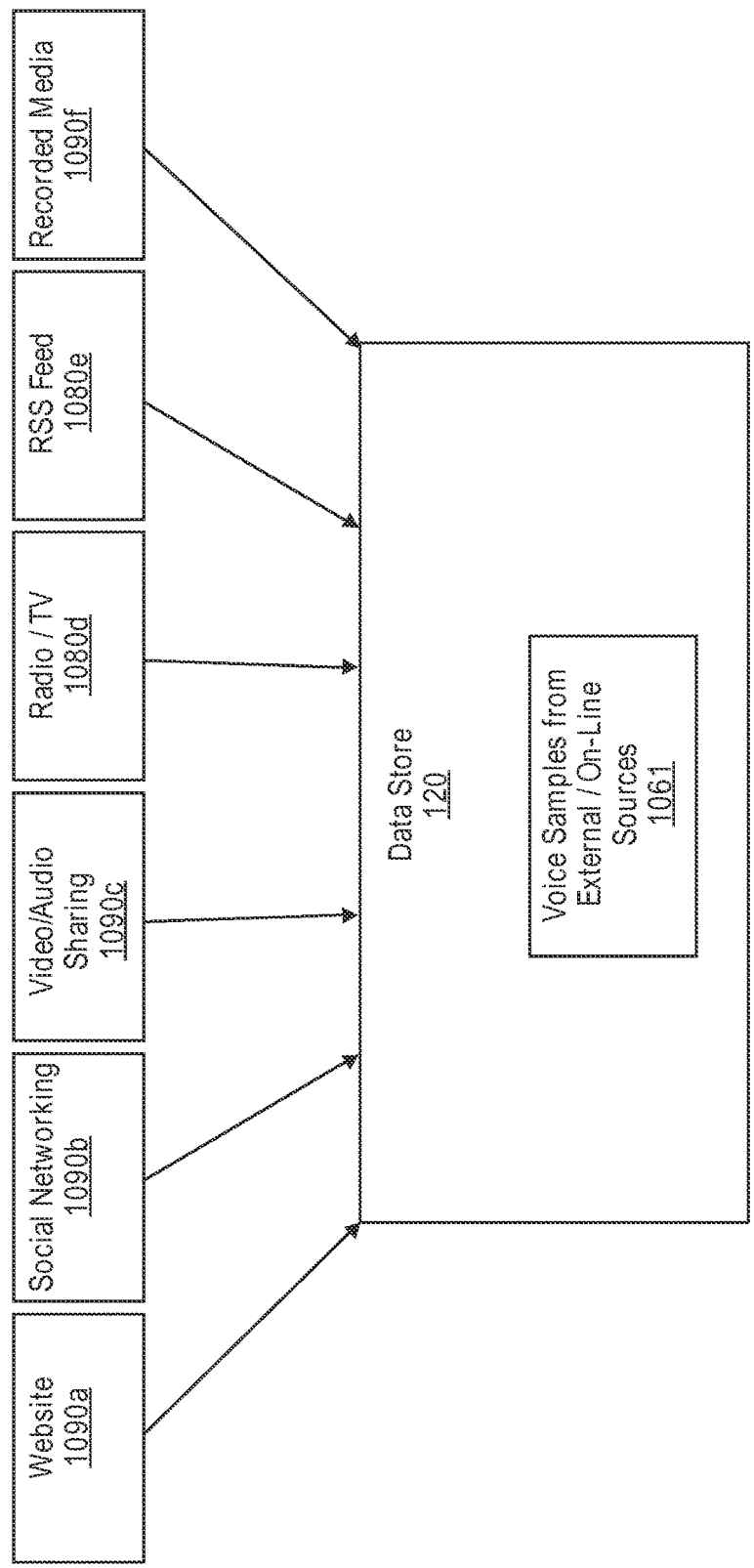

Referring to FIGS. 10A-C, in other embodiments, before the analysis of the preparer's voice input 113 is analyzed, the data store 120 is created by the voice analyzer 116 or other component or program creating a database or table 1000 populated with voice samples 122 and associated data. In the illustrated embodiment, the table 1000 or other data structure (generally, table) shown in FIG. 10A includes columns 1051-1056 for data including voice samples 1061 (e.g., analog voice samples as received from the source), location data 1062 associated with the voice sample 1061 or source, data 1063 of a converted or transformed voice sample such as a conversion or transformation to or involving digital data, a frequency representation, Fourier transformation or Pulse Code Modulation), terms, phrases or tokens 1064 resulting from parsing or tokening the voice sample 1061 or converted or transformed version thereof, the meaning 1065 of the voice sample (such as identification of a related term, tax form, interview screen and/or field), and feedback 1066 provided by the preparer 115 or other source (e.g., confirming whether the voice sample 1061 was successfully utilized as a match to voice data to correctly interpret the voice data 113). It will be understood that FIG. 10A is provided as one example of how the data store 120 may be structured, and as such, is provided as a non-limiting example of how embodiments can be implemented.

Referring to FIG. 10B, in one embodiment, voice samples 1061 are recorded or sampled from speech of other users of the tax preparation application 111 and stored to the table 1000. The voice samples 1061 may be the result of these other users 1080 (e.g., other users 1080*a-e*) speaking voluntarily or in a response to a request made by the tax preparation application 111 upon completion of an electronic tax return, or voice samples 1061 spoken by another preparer and captured or sampled by the voice analyzer 116 during preparation of their own electronic tax return in the case in which the voice analyzer 116 is part of the tax preparation application 111. The host of the data store 120 may also employ persons to speak pre-determined voice samples 1061. Thus, FIG. 10B generally illustrates embodiments in which the voice samples 1061 are provided by or obtained from other users 1080 of the tax preparation application 111, such that the table 1000 can be populated with these voice samples 1061 and related data 1062-1066 as available or known, which may be obtained from the other users' tax returns or based on data provided by the other users.

Referring to FIG. 10C, in another embodiment, voice samples 1061 are received from an electronic or on-line source 1090 other than the tax preparation application 111 and data store 120. For example, the electronic or on-line source 1090 may be a website 1090*a* containing audio or video that can be downloaded or sampled, social media or a social networking forum or website 1090*b*, a video or audio sharing website or application 1090*c*, radio or television or related feeds 1090*d*, a Real Time Syndicated (RSS) feed 1090*e*, recorded audio or video media (such as tape, CD or DVD) 1090*f*, and other sources from which voice samples 1061 can be sampled or selected for storage in the table 1000, or which can be copied or sampled and saved to the table 1000.

Voice samples 1061 may be stored in one or multiple formats or representations. For example, voice samples 1061 can be stored in analog form (column 1051), digital form following analog to digital conversion or as a frequency representation (e.g., as a result of a Fourier transformation) (column 1053) or other format suitable for storage or for inclusion in the table 1000. Thus, it will be understood that that data store 120 may include voice samples 1061 in one or multiple formats, and various types of associated data (columns 1052-1057).

Before or after any format conversion or other processing, voice samples 1061 can be parsed into terms or phrases as necessary, and conversion (e.g., analog to digital conversion) may involve the voice sample as received or the parsed voice sample. The voice samples 1061 and/or associated data based on or derived from the voice samples 1061 may be associated with location data 1062 such that they are linked or associated with each other and stored in the table 1000.

For example, location data 1062 may specify that certain voice samples 1061 were spoken by someone within a particular geographic location determined by address, city, zip code, state or region, country, or a defined neighborhood, whereas location data associated with another voice sample may be for a different person with a different address, in a different city, zip code, state region of the country or neighborhood. Such location data 1062 may be determined based on one or more of the other person's tax return data (e.g., their address entered during preparation of their electronic tax returns), location data entered independently of the electronic tax return, and a physical location of the other person's computing apparatus (such as a location determined or derived from or using a GPS data, triangulation, location information within the content of a website address itself such as the is name or location information within a top level domain of a URL address, a location of a computing apparatus based on its IP address, or other location data associated with the source, website, or audio/video file, which may be specified by the creator or source of the voice sample 1061. Thus, the data store 120 according to embodiments may include voice samples 1061 and associated location data 1062 to indicate respective different locations of the voice sample sources, however the locations are determined.

FIG. 10A also illustrates the table 1000 including "feedback" 1066 which, as will be described in further detail below, may be used to indicate whether the preparer 115 confirms that a voice sample 1061 or related or interpretation data selected as a match to the voice input 113 corresponded to the meaning that was intended to be conveyed by the voice input 113.

Figure 11:
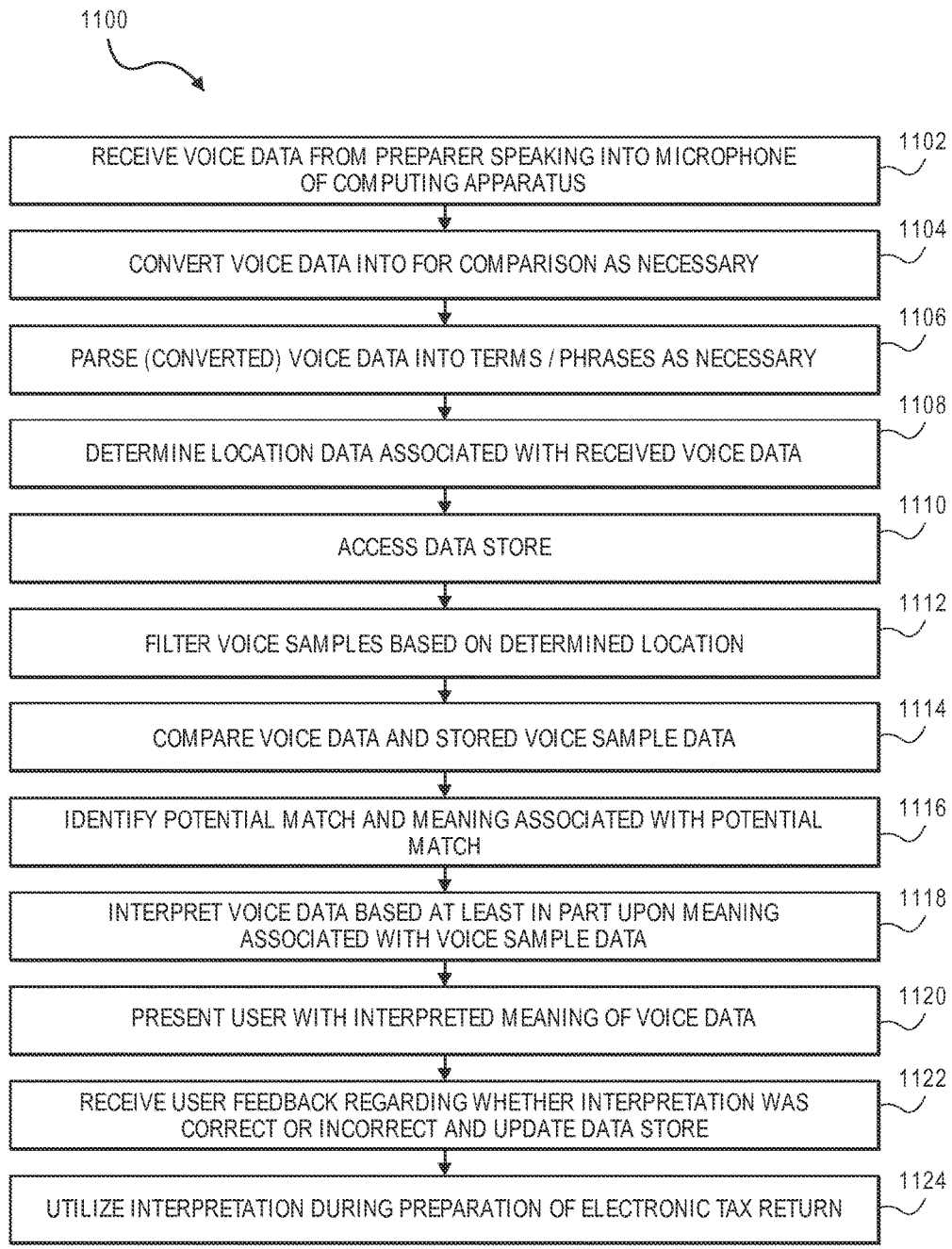
FIG. 11 is a flow diagram of one example of a method for interpreting voice data related to preparation of an electronic tax return involving comparisons of received voice data and stored voice samples.
Figure 12:
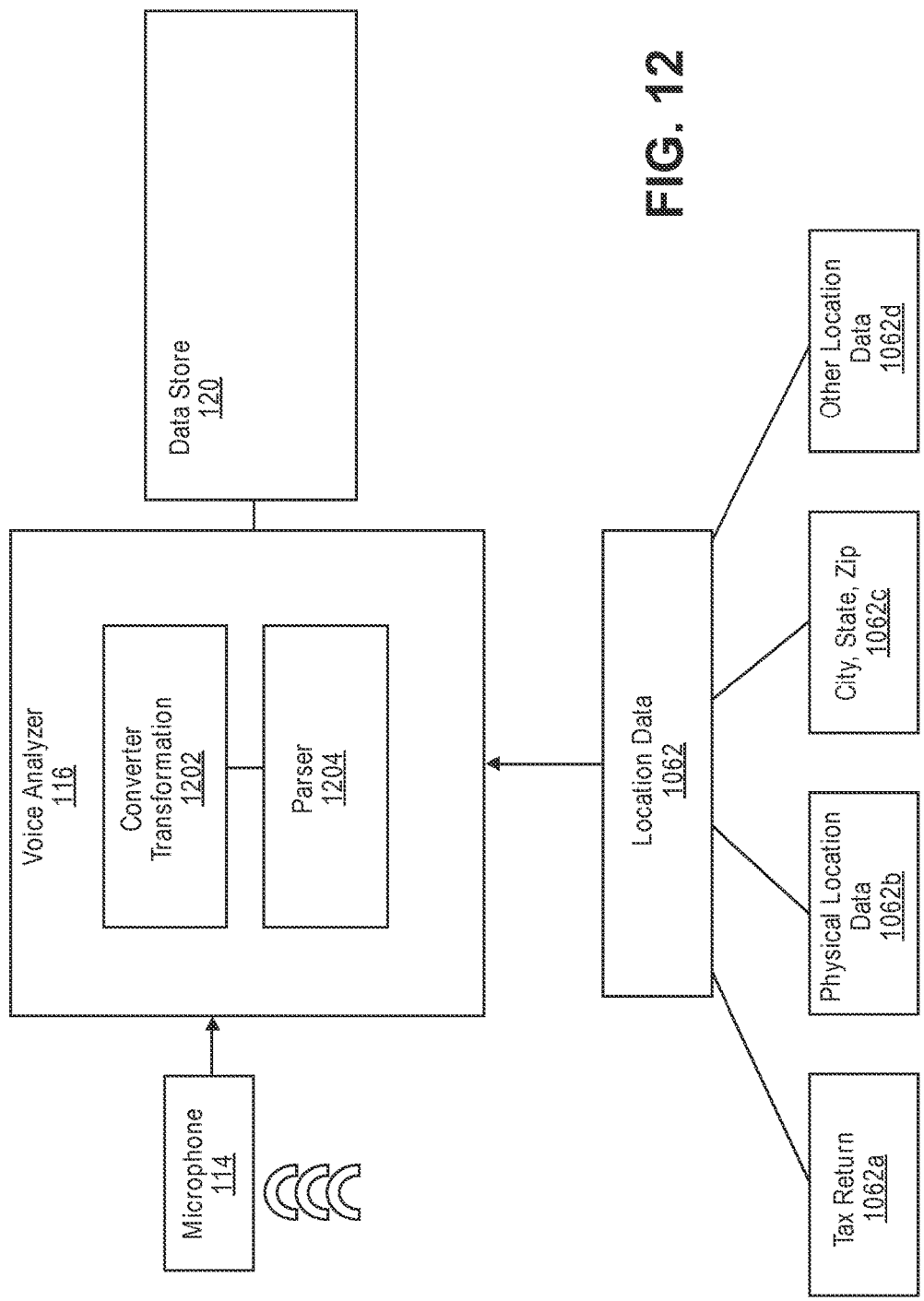
FIG. 12 is a block diagram of a system constructed according to one embodiment for interpreting voice data related to preparation of an electronic tax return and further illustrating how the voice analyzer and database are configured according to embodiments.

Referring to FIGS. 11-12, having described how the data store 120 may be created, populated and structured according to embodiments with pre-determined terms, voice samples and/or associated data, one embodiment of a method 1100 for interpreting voice data 113 of the preparer 115 utilizing the tax preparation application 111 to prepare an electronic tax return 112 involves, at 1102, the preparer 115 speaking into the microphone 114, and the voice analyzer 116 receiving the voice data 113 as an output of the microphone 114.

At 1104, the A-D converter 1202 (or other converter) of the voice analyzer 116 converts the received voice data 113 from analog into digital or other suitable format, if such conversion was not already performed by the microphone 114 or is otherwise necessary. Voice data 113 may be converted from analog to digital, or other conversions and transformations may be performed for subsequent comparisons.

For example, conversions or transformations may involve analog-digital, a frequency representation, a Fourier transformation or pulse code modulation, which expresses the voice data 113 in different ways. Reference is made generally to "voice data" 113 unless a particular format or processing is specified, but it will be understood that the different processing methods can be applied to voice data 113 for subsequent analysis and comparison.

At 1106, if necessary, a parser or tokenizer (generally, parser) 1204 of the voice analyzer 116 parses the received voice data 113 (or converted data) into smaller or individual terms, words or phrases and may differentiate words or text and numerical data spoken by the preparer 115 such as values of wages, taxes, deductions.

With continuing reference to FIGS. 11 and 12, and referring again to FIG. 10, at 1108, the voice analyzer 116 determines location data 1062 associated with received voice data 113. For example, the location data 1062 may be based on a prior or current year tax return 1062a, physical location data 1062b, such as a physical location of the preparer's computing apparatus 110 as determined or derived from GPS data, triangulation, the IP address, address data 1062c such as residence or business address, city, state, zip code or country determined from the electronic tax return 112 being prepared, from a prior year electronic tax return, received by the voice analyzer 116 in response to a request to the preparer 115, or other location data 1062d as described above.

At 1110, according to one embodiment, the voice analyzer 116 accesses the data store 120, and at 1112, filters the data within the data store 120 based on the location 1210 associated with the received voice data 113. While filtering may not be necessary to implement embodiments, filtering can reduce processing times to provide for faster interpretations.

For example, if the data store 120 is organized with voice samples 1061 and location data 1062 data by state, the voice analyzer 116, determining a state (e.g., Wisconsin) in step 1112, may filter out, or not select or consider, other voice samples 1061 and related data in the data store 120 for states other than Wisconsin, thus eliminating the need to analyze voice samples from people in 49 other states. It will be understood that other filtering functions may be applied using other location or geographic criteria, and filtering by state is one example of how embodiments may be implemented.

At 1114, the voice analyzer 116 compares the received voice data 113 and the stored voice samples 1061 (or converted or transformed voice samples or data 1063). For example, step 1114 may involve comparing analog voice data 113 and analog voice samples 1061, comparing digital voice data 113 and digital voice samples 1063, comparing frequency representations such as Fourier transformations of the received voice data 113 and voice samples 1063. Thus, received voice data 113 can be converted or transformed as necessary to allow for comparison with voice samples 1061 or converted or transformed voice samples or voice sample data 1063. Reference is made generally to a voice sample 1061, but it will be understood that such comparisons may involve analog, digital and other versions, formats and representations such as Fourier transformations of the voice sample 1061.

At 1116, the voice analyzer 116 identifies a voice sample 1061 that is a potential match to the received voice data 113 based at least in part upon the comparison, e.g., based on Fourier transformation data of the voice data 113 matching or substantially matching Fourier transformation data of the voice sample 1063.

At 1118, the voice analyzer 116 interprets the preparer's voice data 113 based at least in part upon meaning associated with voice sample data. Embodiments may arrive at an interpretation of the voice data 113 in different ways.

For example, the preparer 115 may speak a phrase, and the voice analyzer 116 finds a matching voice sample 1061 in the data store 120, and the voice analyzer 116 may determine a description, identifier or category associated with the matching voice sample 1061. As another example, the data store 120 may include a pre-determined response that is presented to the preparer 115. For example, the table 1000 may include a column for pre-determined responses such as "Did you mean 'retirement'" or "Did you intend to prepare Form 1040?"

According to another embodiment, the meaning may be determined to relate to a particular tax form, interview screen or field thereof, and the voice analyzer 116 can read the tax form(s), interview screen(s) and field(s) associated with the matching voice sample 1061 and proceed to present those form(s), interview screen(s) and field(s) to the preparer 115.

At 1120, the voice analyzer 116 may provide the preparer 115 with the opportunity to provide feedback concerning the voice analyzer's interpretation. The preparer 115 may confirm that the interpretation was correct, or incorrect and provide a correction or clarification regarding the interpretation.

At 1122, the voice analyzer 116 can record or incorporate this feedback to the table 1000 (column 1056) to note whether a match was made and the voice input 113.

For example, if the interpretation was correct in that a match of the voice data 113 or binding to a token or term in the data store was made, the result may be that in addition to presenting the token or term to the preparer 115, the preparer's voice data 113 may be added to the table (FIG. 10, column 1051) and associated with the location (column 1052), indicating that the voice analyzer's processing correctly processed and interpreted location-based speech attributes of the preparer 115 such as accents, speech duration, pronunciations, etc. Thus, the table 1000 may be updated dynamically to reflect other matching voice samples associated with location data 1062.

However, if the result was not correct, the voice analyzer 116 may request a corrected or clarified interpretation from the preparer 115, and this manually entered data may then be used to update, correct or supplement the table 1000 as appropriate. Further, the voice analyzer 116 may not add the voice data 113 to the table 1000 or take other action such as delete or update location data 1062 associated with the voice sample 1061 that was selected as a potential match to the voice data 113.

Thus, embodiments provide for an intelligent voice analyzer-database system that can dynamically update the table 1000 to reflect actual interpretation results to improve interpretation accuracy and how speech attributes are processed for improved speech recognition and subsequent presentation and population of forms, interview screens and fields thereof.

At 1124, the result of the interpretation is used for preparation of electronic tax return 112. One embodiment involves the voice analyzer 116 reading data in the table 1000 related to the matching voice sample 1061 to identify a field of a form or interview screen to be populated with tax return data corresponding to voice data 113, and presenting the preparer 115 or directing the preparer 115 to the identified field to be populated. The identified field may be populated with tax return data based on the voice data 113, or based on other input or voice instructions of the preparer 115.

Other embodiments are directed to presenting additional information or questions about the particular result. For example, if the voice analyzer 116 determines that the preparer's voice input of "I.N.T." or "int" was intended to identify 1099-INT tax form, the voice analyzer 116 (or the tax preparation application 111 in response to a request by the voice analyzer 116) retrieves and presents other forms, screens, fields or questions related to "int" or 1099-INT as a result of being previously associated, related or linked within the table 1000. For example, having established that the preparer's voice input 113 was intended to refer to 1099-INT, the voice analyzer 116 may access the data store 120 and identify associated or linked follow-up questions to be presented in response to the user's "1099-INT" request such as "Who did you receive this 1099-INT from?" or "What amount is listed in the Interest Amount, Box 1 field?" As another example, if the preparer 115 has spoken an EIN number while entering a W-2 form, this voice input 113 can be recognized to present the preparer 115 with follow-up questions such as "We show this employer listed as "x" company. Is this correct?" With each answer to each question, the voice analyzer 116/tax preparation application 111 can respond with additional comments and questions given the relational or linking structure of such comments and questions utilized according to embodiments. Thus, the preparer's voice data 115 may identify one form, screen, section or field, with the result that various other additional forms, screens, sections or fields, can be presented to the preparer according to a pre-determined relational structure such as a tree structure, thus reducing or minimizing the voice input required to call up these additional forms, screens, sections or fields.

In other embodiments, the relational structure can identify and present to the user other forms that may be indirectly associated with or linked with a result. Continuing with the example of the preparer requesting a 1099-INT tax form, the voice analyzer 116/tax preparation application 111 may then determine, according to a pre-determined relational or tree structure, that the preparer 115 should also be presented with other income-related forms such as a 1099-DIV dividend form. As another example, the voice data 113 results in identification of a field for a mortgage interest deduction, and the voice analyzer 116 interprets that voice data 113 to further identify and present other related fields related to "mortgage interest deduction" such as property tax, rental income, etc., that are to be populated with other, related types of tax return data. Thus, with embodiments, the preparer 115 has requested one form or section, and when completed with that requested form or section, may be automatically directed to other related or linked forms or sections, thus reducing or minimizing the voice input required to navigate to these other forms, screens, sections or fields.

According to yet another embodiment, rather than identifying a single field, the data store identifies multiple fields, in the same or different forms or interview screens, and all of the fields are presented to the preparer 115 to populate or automatically populated with the same tax return data. Thus, for example, if the preparer's voice data 113 "SSN" is determined to be for "social security number" the voice analyzer 116/tax preparation application may identify all of the other forms or fields that require a social security number and populate and present and/or populate all of those other forms or fields with the same social security number data.

Thus, interpretation of the voice data 113 may involve determining the meaning of the voice data 113 to populate a previously identified field or field selected the preparer 115, identifying and presenting a field to be populated to the preparer 115, automatically populating a field identified by the voice analyzer 116, identifying and presenting multiple fields to be populated with the same tax return data, automatically populating multiple fields with the same tax return data, identifying and presenting a first field for first tax return data and identifying and presenting a second field to be populated with second tax return data.

Figure 13:
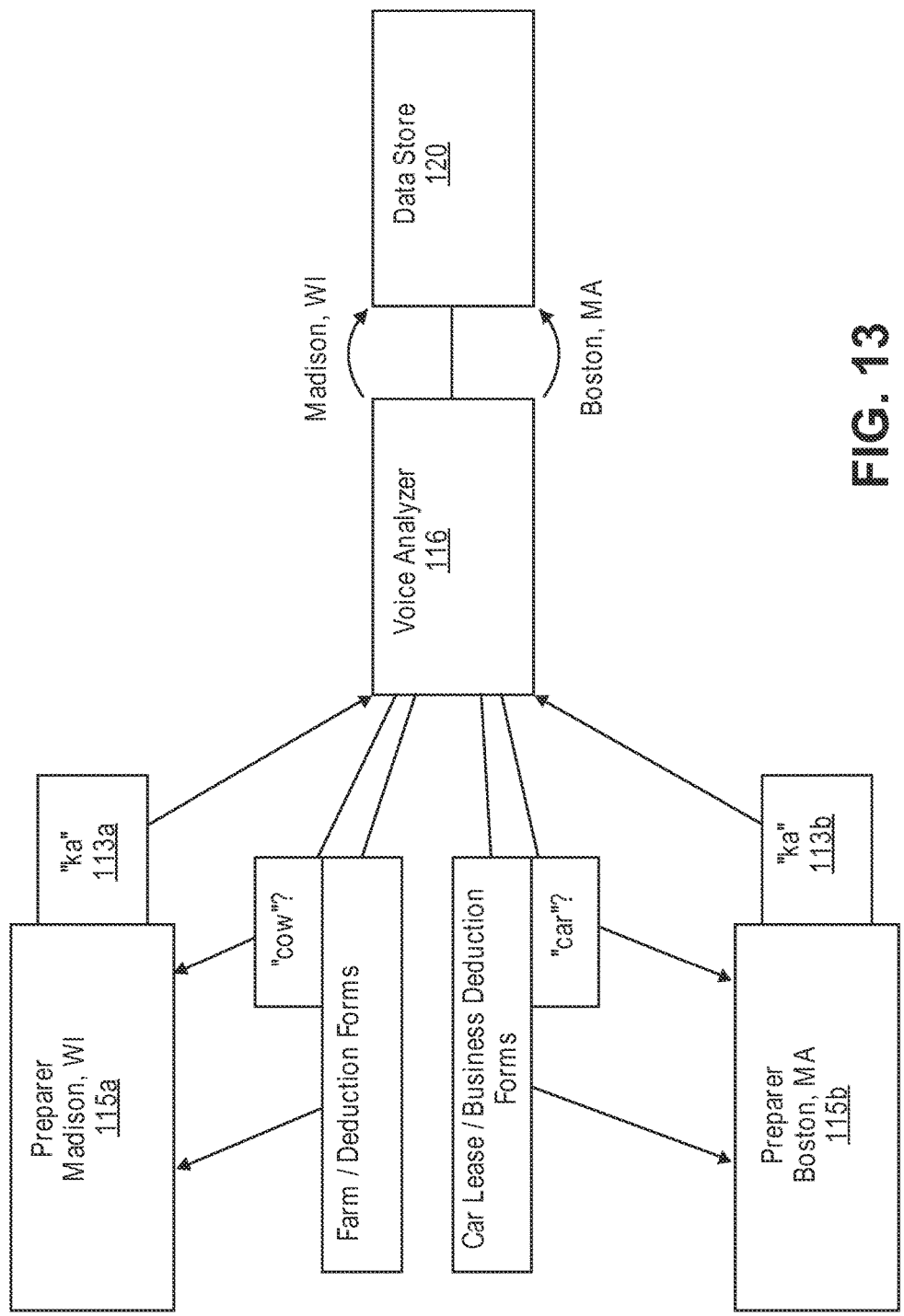
FIG. 13 illustrates one example of how embodiments may be implemented to perform location-based voice analysis to determine different meanings of the same or similar sounding term spoken by different preparers whose voice data has different speech attributes.

FIG. 13 illustrates an example of how embodiments may be utilized to perform speech recognition that accounts for different accents or pronunciations of the same tax-related term "car" spoken by different users or preparers 115. In this example, preparers 115a and 115b from locations Madison, Wis. and Boston, Mass. are preparing their respective electronic tax returns 112a and 112b. Numerical references to "a" refer to the first preparer 115a or associated system components, and references to "b" refer to the second preparer 115b or associated system components. During preparation of their electronic tax returns 112a and 112b, each preparer 115a and 115b speaks a term that sounds like "ka" 113a and 113b.

Given the different accents and how certain terms are pronounced in different ways by these different preparers 115a and 115b, the intended meaning of "ka" 113a and 113b may not be clear or discernible. However, with embodiments, the voice analyzers 116 (or respective voice analyzers 116a and 116b that are part of respective tax preparation applications 111a and 111b) receive and process their "ka" voice inputs 113a and 113b and access the data store 120 to process the inputs to determine what was actually intended by these preparers 115a and 115b given their respective location-based speech attributes (e.g., different accents, pronunciations, speech cadences, etc.)

For the first preparer 115a from Madison, the voice analyzer 116a processes the first voice input 113a based on the first location data 1063a "Madison" (or other data such as a zip code or state) which may be determined from the first preparer's electronic tax return 112a or other location sources or methods. Similarly, for the second preparer 115b from Boston, the voice analyzer 116b processes the second voice input 113b based on the second location data 1063b "Boston," which may be determined from the second preparer's electronic tax return 112b or other location sources or methods.

For the first preparer 115a, the voice analyzer 116 converts or transforms the "ka" input 113a, e.g., into a first Fourier transformation, accesses the data store 120a, compares the first Fourier transformation to other Fourier transformations of respective voice samples 1061a associated with or linked to "Wisconsin" location data 1062a in the table 1000a. The voice analyzer 116a identifies a potential match based on the frequency representation comparisons, and determines that while the voice input 113a of the first preparer 115a sounded like "ka," based on location of Wisconsin and associated "Midwestern" accent, the voice analyzer 116a determines that the first preparer 115a actually intended to refer to "cow" instead of another interpretation based at least in part upon the preparer's location and the location data of the voice sample 1061a. The voice analyzer 116a may then present the "cow" determination to the first preparer 115a and allow the first preparer to confirm that "ka" was intended to refer to "cow." The voice analyzer 116a or the tax preparation application 111a may then look up electronic tax return fields associated with the "cow" voice sample and "Wisconsin" location data 1062a to identify tax return fields related to, for example, farm expenses and business deductions.

For the second preparer 115b, the voice analyzer 116b converts or transforms the "ka" input, e.g., into a second Fourier transformation, accesses the data store 120b, compares the second Fourier transformation to other Fourier transformations of respective voice samples 1061b identified with "Massachusetts" location data 1063b. The voice analyzer 116b identifies a potential match based on the frequency representation comparisons, and determines that while the second preparer's voice data 113b also sounded like "ka" the second prepare 115b actually intended to refer to "car" (rather than "cow") given the second preparer's "East Coast" or "Boston" accent or other speech attribute associated with the preparer's location. The voice analyzer 116 may then present the "car" determination to the second preparer 115b and allow the second preparer 115b to confirm that "ka" was intended to refer to "car." The voice analyzer 116b or the tax preparation application 111b may then look up electronic tax return fields associated with the "car" voice sample and "Massachusetts" location data 1062b to identify tax return fields related to, for example, deductions for leasing a car used for business purposes and deductions for payment of car registration fees.

FIG. 13 illustrates one example of how embodiments are able to consider a preparer's unique speech attributes and voice sample data linked to location data in the data store 120 and resolve location-based speech attributes to determine what the speaker intended. Further, FIG. 13 illustrates a specific example showing how a similar sound can be resolved to determine that different people actually intended that sound to mean a different words or phrases. It will also be understood that embodiments can be applied to accurately interpret voice data by different persons at different locations who may speak different terms in a similar manner using speech attributes or conversions of the received voice data 113 and stored voice samples 122. Thus, the result may be that voice inputs that sound the same or similar when spoken by different preparers 115 were actually intended to different terms related to the electronic tax return. Accordingly, it will be understood that "ka" being interpreted as "cow" and "car" in view of location-based speech attributes of different preparers 115 is provided as one example of how embodiments may be implemented, and that such interpretations may involve various speech attributes and patterns, such as accents, pronunciations, certain location-based phrases, speech pauses, duration and speed. Embodiments are able to address and account for various speech attributes as a result of comparing received voice data to voice samples associated with the pertinent location, which accounts for these differentiating speech attributes.

Figure 14:
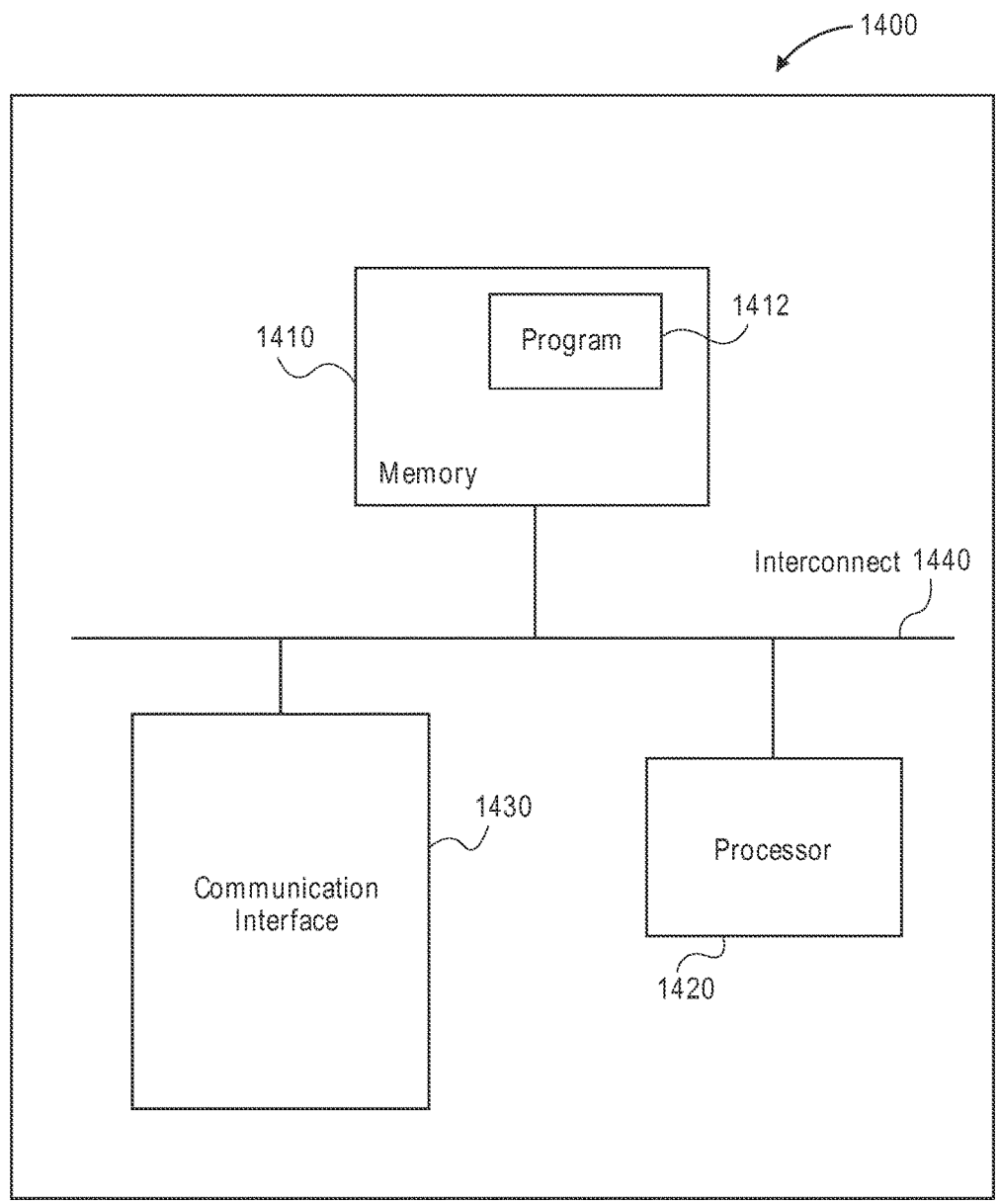
FIG. 14 is a system diagram of components of computing apparatus that may be utilized by various system components.

Components of a computing device 1400 that may be a component of system embodiments or utilized to perform various method steps includes a memory 1410, a program or instructions 1412, a processor or controller 1420, a network or communications interface 1430, and connections or interconnect 1440 between such components. For example, the memory 1410 may be or include one or more of cache, RAM, ROM, SRAM, DRAM, RDRAM, EEPROM and other types of memory. The processor unit 1420 may be or include multiple processors, a single threaded processor, a multi-threaded processor, a multi-core processor, or other type of processor. Depending on the particular system component (e.g., whether the component is a computer or a hand held mobile communications device), the interconnect 1440 may include a system bus, LDT, PCI, ISA, or other types of buses, and the communications or network interface may, for example, be an Ethernet interface, a Frame Relay interface, or other interface. The network interface 1430 may be configured to enable a system component to communicate with other system components across a network which, as explained above, may be a wireless or various other networks. Accordingly, the system configuration provided in FIG. 14 is provided for ease of explanation and illustration to generally illustrate system components that may be utilized in various embodiments.

Method embodiments may also be embodied in, or readable from, a non-transitory computer-readable medium or carrier, e.g., one or more of the fixed and/or removable data storage data devices and/or data communications devices connected to a computer. Carriers may be, for example, magnetic storage medium, optical storage medium and magneto optical storage medium. Examples of carriers include, but are not limited to, a floppy diskette, a memory stick or a flash drive, CD-R, CD-RW, CD-ROM, DVD-R, and DVD-RW. The processor 1420 performs steps or executes program instructions 1412 within memory 1410 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while embodiments are described with reference to a computing apparatus, it will be understood that the preparer may speak into various types of computing apparatus including computers, tablets and mobile communication devices. Further, while certain embodiments are described with reference to live voice data spoken by a preparer while preparing the electronic tax return, embodiments can also be applied to analyze recorded voice data. For example, the preparer may be driving and record voice data for data entry or instructions, and this previously recorded data can then be played or provided as an input to the voice analyzer, which processes the previously recorded terms or phrases according to embodiments.

Further, while embodiments are described with reference to a separate tax preparation application and a voice data analyzer, it should be understood that the voice data analyzer may be a component of the tax preparation application or a separate program as described. Further, it should be understood that the tax preparation program and/or the voice data analyzer may execute on the preparer computer or other computers such as the intermediate computer, which may also host the database.

While certain embodiments are described with reference to location-based filtering of voice samples before voice data comparison, other embodiments may involve comparisons with all available voice samples.

Additionally, it should be understood that embodiments may involve tax returns of individuals and various other entities including corporate entities.

Further, while certain embodiments are described with reference to a data store having certain types of data, it will be understood that the data store, database or table utilized may be structured with other data and other relational attributes and links. For example, while embodiments have been described with reference to location data being associated with voice samples, in other embodiments, the data store may use commonly used tax return related terms without reference to location to interpret, aid in interpretation or confirm an interpretation of voice data. As another example, it will be understood that the meaning may be in the form of a text description, identification of a single form, screen or field, identification of multiple forms, screens or fields, or identification of a tree or relational structure of related forms, screens and fields.

It will also be understood that embodiments may be utilized to populate a portion of an electronic tax return, populate an entire electronic tax return, and to initiate filing of the electronic tax return.

Further, it will be understood that embodiments may be configured to access the data store to consult a term/phrase library (with or without reference to location data), execute comparisons and voice data interpretations based at least in part upon location, and account for unique speech attributes such as accents, pronunciations, etc., associated with the location data analyzed, and such analysis may involve preparation of electronic tax returns or other electronic documents and speech recognition applications.

Further, while multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, particularly in instances in which certain steps may or may not be performed or may be performed simultaneously. Accordingly, embodiments are intended to exemplify alternatives, modifications, and equivalents that may fall within the scope of the claims.

What is claimed is:

1. A computer-implemented method, comprising:
 a computing device, by a computerized tax return preparation application comprising computer-executable instructions stored in a data store of the computing device and executed by the processor of the computing device,
 receiving respective voice samples of respective users of the tax preparation application;
 parsing the voice samples into voice sample terms;
 generating a voice sample database comprising:
  voice sample terms,
  location data associated with respective electronic voice sample terms, and
  identification of respective interview screens or tax forms of the computerized tax return preparation application is associated with respective voice sample terms and respective location data;
 after generation of the voice sample database, the computing device, by the computerized tax return preparation application:
  receiving, from a computing apparatus utilized to prepare an electronic tax return utilizing the computerized tax return preparation application, an electronic output generated by a microphone of the computing apparatus based on voice input comprising the preparer of the electronic tax return speaking into the microphone of the computing apparatus during preparation of the electronic tax return;

determining location data of the electronic output;
parsing the electronic output into voice data terms;
accessing the previously generated voice sample database;
determining a meaning or intent of the voice input of the preparer based at least in part upon voice data terms and associated location data of the received voice data and respective stored voice sample terms and associated location data of the generated voice sample database;
selecting an interview screen or tax form of the computerized tax return preparation application based at least in part upon the determined meaning or intent of the voice input;
automatically populating the selected interview screen or tax form with associated electronic tax return data determined based at least in part upon the electronic output;
executing machine learning by communicating a request for feedback whether the determined meaning or intent of the voice input was what the prepare intended to be conveyed by the voice data, receiving a response from the preparer in response to the request for feedback, and updating the voice sample database based on the received response to improve accuracy of future voice data interpretation during preparation of future electronic tax returns, the response being associated with a previously recorded voice sample and the location data of the associated voice sample;
determining at least one additional interview screen or tax form to present to the user based at least in part upon the generated voice sample database;
presenting the at least one additional interview screen or tax form to the preparer through a display of the computing device without additional preparer input thereby improving how interview screens or tax forms are presented to the preparer by the computerized tax return preparation application during preparation of an the electronic tax return.

2. The method of claim 1, the voice input comprising live voice data spoken by the preparer into the microphone during preparation of the electronic tax return.

3. The method of claim 1, wherein interpretation of the received voice data is based at least in part upon the location data associated with the received voice data of the preparer comprising location data that has been already entered into the electronic tax return being prepared utilizing the computing apparatus.

4. The method of claim 3, the location data that has been already entered into the electronic tax return being prepared being selected from at least one of the group consisting of a city, a state, a zip code and a country.

5. The method of claim 1, the location data of the received voice input being determined by a computerized voice analyzer element of the computerized tax return preparation application independently of the electronic tax return being prepared, wherein the location data of the received voice input is based at least in part upon location data of the computing apparatus utilized to prepare the electronic tax return.

6. The method of claim 5, the location data of the computing apparatus utilized to prepare the electronic tax return comprising global positioning system location data of the computing apparatus.

7. The method of claim 5, the location data of the computing apparatus utilized to prepare the electronic tax return comprising an internet protocol address assigned to the computing apparatus.

8. The method of claim 1, the location data of the received voice input being determined by a computerized voice analyzer element of the computerized tax return preparation application and independently of electronic data of the electronic tax return.

9. The method of claim 1, a computerized voice analyzer element of the computerized tax return preparation application interpreting the received voice data comprising:
selecting a previously recorded voice sample of another person in the data store as a potential match to the received voice input based at least in part upon the location data of the received voice input and location data of the selected voice sample of another person;
determining a meaning of the selected voice sample based least in part upon the location data of the received voice data and voice sample location data; and
interpreting the received voice data based at least in part upon the determined meaning.

10. The method of claim 9, the voice samples and respective location data of respective voice samples stored in the data store reflecting how different persons at different locations speak the same terms related to the electronic tax return differently, wherein similarities between speech patterns in the received voice data and previously recorded voice samples stored in the data store are determined by the computerized voice analyzer element to interpret the received voice data.

11. The method of claim 9, selecting the previously recorded voice sample comprising the computerized voice analyzer element:
filtering previously recorded voice samples based at least in part upon the location data of the received voice data of the preparer to select previously recorded voice samples;
comparing the received voice data and the selected previously recorded voice samples; and
selecting a voice sample based at least in part upon the comparison,
wherein interpreting the received voice data is based at least in part upon the selected voice sample.

12. The method of claim 9, wherein multiple previously recorded voice samples stored in the data store are selected by the computerized voice analyzer element as potential matches, the method further comprising the computerized voice analyzer element:
receiving an indication of a stored voice sample selected by the preparer,
wherein the meaning of the preparer selected voice sample is determined, and the interpretation of the received voice data is based at least in part upon the determined meaning of the preparer selected voice sample.

13. The method of claim 9, further comprising the computerized voice analyzer element receiving and storing voice samples of respective persons and associated with a term utilized to prepare the electronic tax return term, the respective voice samples being previously spoken by different other persons in respective different geographic locations.

14. The method of claim 13, wherein the different other persons are other users of the computerized tax return preparation application.

15. The method of claim 1, the response indicating that the interpretation was correct, the method further comprising the computerized tax return preparation application updating the voice sample database by storing the received voice data to the voice sample database, the received voice data being associated with the meaning of the identified voice sample.

16. The method of claim 15, further comprising the computerized tax return preparation application updating the voice sample database by adding the location data of the of the received voice data to the location data of the identified previously recorded voice sample and the meaning of the identified previously recorded voice sample.

17. The method of claim 1, the response indicating that a first interpretation was incorrect and providing a second interpretation relative to the electronic tax return, the method further comprising the computerized tax return preparation application updating the voice sample database by:
   identifying another previously recorded voice sample stored in the voice sample database in the data store having another meaning corresponding to the second interpretation; and
   storing the received voice data to the voice sample database in the data store, the received voice data being associated with the other identified previously recorded voice sample and the other meaning.

18. The method of claim 17, further comprising the computerized tax return preparation application updating the voice sample database by adding the location data of the received voice data to location data of the other identified previously recorded voice sample and the other meaning.

19. The method of claim 17, further comprising the computerized tax return preparation application updating the voice sample database by deleting location data that was initially associated with the first interpretation based at least in part upon the first interpretation of the voice data being incorrect.

20. The method of claim 1, further comprising the computerized tax return preparation application:
   selecting a first field or section of the electronic tax return associated with the interpretation of the received voice data;
   converting the received voice data into tax return data; and
   populating the first field or section with the tax return data.

21. The method of claim 20, further comprising, before the first field or section is populated, the computerized tax return preparation application receiving confirmation from the preparer that the selected first field or section is to be populated with the tax return data.

22. The method of claim 20, further comprising:
   a computerized voice analyzer element of the computerized tax return preparation application selecting at least one additional field or section of the electronic tax return that is associated with the first field or section and converting the voice data into tax return data; and
   the computerized tax return preparation application automatically populating the first field or section and the at least one additional field or section with tax return data.

23. The method of claim 22, further comprising, before the first field or section and the at least one additional field or section are populated, the computerized tax return preparation application receiving confirmation from the preparer that the first field or section and the at least one additional field or section are to be populated with the tax return data.

24. The method of claim 1, wherein the interpretation of the received voice input involves a tax document or interview screen generated by the computerized tax return preparation application, the method further comprising computerized tax return preparation application:
   determining questions to be presented to the preparer about the tax form or interview screen; and
   presenting the questions to the preparer through a display of the computing apparatus without additional voice input by the preparer.

25. The method of claim 1, wherein the interpretation of the received voice data involves a first tax document or interview screen, the method further comprising the computerized tax return preparation application:
   selecting a second tax document or interview screen related to the first tax document or interview screen; and
   presenting the second tax document or interview screen to the preparer through a display of the computing apparatus without additional voice input by the preparer.

26. The method of claim 1, wherein interpretation of the received voice sample based at least in part upon the location data of the received voice sample accounts for an accent associated with a location from which the voice sample was received.

27. The method of claim 1, wherein interpretation of the received voice sample based at least in part upon the location data of the received voice sample accounts for a colloquial expression spoken in a location from which the voice sample was received and that is related to a term of the electronic tax return.

28. The method of claim 1, wherein interpretation of the location data of the received voice sample based at least in part upon the location data of the received the voice sample accounts for a pronunciation of a term spoken in a location from which the voice sample was received and that is related to the electronic tax return in the location.

29. The method of claim 1, the location data of the received voice data comprising data of a region, a state or a zip code in which the preparer resides.

30. The method of claim 1, the voice input being interpreted by a computerized voice analyzer element of the computerized tax return preparation application based at least in part upon a comparison of the received electronic output and previously recorded voice samples reflecting how different persons at different locations speak the same terms related to the electronic tax return differently, wherein similarities between speech patterns in the received voice data and previously recorded voice samples stored in the data store are determined by the computerized voice analyzer element to interpret the received voice data.

31. The method of claim 1, the second format comprising frequency domain representations of the voice samples and the received voice data.

32. The method of claim 31, the frequency domain representations being generated by application of a Fourier transformation to the voice samples and the received voice data.

* * * * *